United States Patent [19]

Mattone et al.

[11] 3,912,721

[45] Oct. 14, 1975

[54] METHOD FOR EXTRACTING LACTAMS FROM ACIDIC REACTION MIXTURES

[75] Inventors: Roberto Mattone, Seveso; Giancarlo Sioli, Como; Luigi Giuffre, Milan, all of Italy

[73] Assignee: Snia Viscosa Societa' Nazionale Industria Applicazioni Viscosa S.p.A., Milan, Italy

[22] Filed: June 26, 1973

[21] Appl. No.: 373,799

[30] Foreign Application Priority Data
June 28, 1972 Italy.................................. 26384/72

[52] U.S. Cl.................... 260/239.3 A; 260/239.3 A
[51] Int. Cl.²........................................ C07D 201/16
[58] Field of Search............................. 260/239.3 A

[56] References Cited
FOREIGN PATENTS OR APPLICATIONS
1,021,709   3/1966   United Kingdom.......... 260/239.3 A

*Primary Examiner*—Norma S. Milestone
*Assistant Examiner*—Robert T. Bond
*Attorney, Agent, or Firm*—Shlesinger, Fitzsimmons & Shlesinger

[57] ABSTRACT

A method is disclosed for recovering lactams from acidic reaction mixtures, the improvement consisting in the fact that the extractant is an alkylsubstituted phenol the alkyl chain of which contains at least three carbon atoms, the alkyl substituent being capable of imparting to the phenol a lipophilic character. Mono-substituted and disubstituted phenols, such as isopropyl phenols, sec. and tert. butyl phenols, sec. and tert. amylphenols, di-sec. amylphenols and di-tert. amylphenols are preferred.

6 Claims, No Drawings

METHOD FOR EXTRACTING LACTAMS FROM ACIDIC REACTION MIXTURES

This invention relates to a method for extracting lactam, more particularly omega-lactams (the method will be specifically described hereinafter with reference to caprolactam as defining the field of present prevailing interest for the industrial application of the invention) from acidic solutions, as normally comprising reaction mixtures which contain such lactams, more particularly acidic reaction mixtures.

Lactams can be obtained, as is known, with different processes which are conducive to the obtention of lactam solutions, which are generally acidic due to sulfuric acid. As is known these mixtures can be obtained by rearrangement of an oxime into a lactam, or by nitrosation of aliphatic compounds, as disclosed for example in the previous Italian Pat. Specification Nos. 603,606 and 608,873 and the U.S. application No. 325,563 filed on Jan. 22, 1973 all by the same applicant hereof.

In any case, a lactam solution (such as caprolactam) is obtained, in sulfuric acid. According to the most commonly adopted technology, the lactam is extracted by neutralizing the sulfuric acid, for example with ammonia, soda or other bases, by extracting the lactam from the resultant mixture and lastly by recovering the latter by distillation.

As is known, these methods have considerable drawbacks and limitations, both of technical and economical nature. Among these shortcomings particularly important is the fact that the extraction process leads to the production of a considerable amount of ammonium sulfate (or another sulfate, according to the base used) and the consumption of a correspondingly high amount of sulfuric acid.

In the appertaining patent literature, and especially in the British Specification No. 1,021,709 a procedure is disclosed for the extraction of caprolactam as obtained by oxime rearrangement a method which, in theory, should have been conductive to the suppression of the above enumerated defects. This procedure provided for the extraction of caprolactam directly from the acid solutions containing it by an organic solvent, more particularly phenol. In the above cited patent specification it has been suggested that the organic extraction medium (phenol) should comply with the requirements (a) of being liquid at the extraction temperature (which was indicated within a very wide range, starting from the ambient temperature, that is, from +20°C to +100°C and exemplified with values of 20°C to 25°C, (b) of being not substantially soluble in the acidic phase of the mixture obtained as a result of the transposition, and (c) of being chemically inactive with respect to the latter.

It has been ascertained, however, that this suggestion, though both technologically and economically attractive, is unsatisfactory in practice for several reasons, more particularly on account of the twofold defect of the impossibility to arrive at a complete extraction of the caprolactam from the acidic reaction mixture and the fact that a considerable amount of the extraction medium remains in the acidic solution, thus becoming both dispersed and unusable. In the above indicated patent literature the examples had been brought of the use of phenol and cresol, the latter being conducive to results which were considerably less than those obtained with the use of phenol.

According to the invention, it has been found that the extraction of omega-lactams, more particularly caprolactam, from acidic solutions and more particularly from the reaction mixtures containing them, can be carried out in an extremely satisfactory way and with quantitative results by employing, as the extraction solvent, a phenol which is substituted by at least an alkyl substituent, capable of imparting to the phenol particular lipophilic characteristics, and whose alkyl chain comprises, as a total, at least three carbon atoms. The class of the phenols, with whose use as an extraction solvent the present invention is concerned, can also be defined by the fact that all the phenols belonging to this class have a solubility in water of less than 0.5 and preferably of less than 0.3 grams per 100 grams of water and their solubility in sulfuric acid should be less than 0.2 and preferably less than 0.1 grams per 100 grams of sulfuric acid diluted at 50% with water, also under the condition that the nature, the quantity and the position of the substituent groups should not be such as to hinder the activity of the —OH group of the phenol, as indicated by the fact that the absorption band exhibited at the infrared spectrophotometry at 2.7 microns, by very diluted solutions of any phenol, is gradually shifted for solutions which are gradually more concentrated of the active phenols only, to the ends of this invention, towards 3.0–3.2 microns.

Phenols which respond to the above indicated characteristics and properties, in addition to that of being liquid at the temperatures which can be most advantageously be adopted in the extraction runs (although it has been ascertained that such phenols are active, to the ends of the subject method, also when they are used as solutions) comprise:
- among the monosubstituted phenols:
  - o-, m- and p-isopropylphenol
  - o- sec. butylphenol
  - o- tert. butylphenol
  - o- tert. amylphenol
  - o- sec. amylphenol
  - p- sec. amylphenol and their mixtures
- among the disubstituted phenols:
  - -di- sec. amylphenol
  - -di- tert. amylphenol and their moxtures.

By way of comparison, there are reported in the attached Table I the solubility values in 100 grams of water and of 50% sulfuric acid, of the phenols as suggested previously in the art (the above cited British Patent) as compared with the values for a few preferred phenols according to the invention, and indicated in the examples which will follow.

TABLE I

| Chemical name | solubility in 100 grams of water | 50% sulfuric acid | Temperature of the solubility test | OTHER CHARACTERISTICS | | Density |
| | | | | Melting point | Boiling point | |
|---|---|---|---|---|---|---|
| Phenol | 8,6 gr. | 0,7 Gr. | 19 | 41 | 182 | 1,072 20/4 |
| o-cresol | 2,5 cc. | 0,4 cc. | 22 | 30 | 191,5 | 1,046 20/4 |
| m-cresol | 2,35 cc. | 0,3 cc. | 20 | 11–2 | 202,8 | 1,034 20/4 |
| Xylenols (2-4/2-6) | 0,80 cc. | 0,3 cc. | 20 | | 62,66 | |

TABLE I-continued

| Chemical name | solubility in 100 grams of water | solubility in 100 grams of 50% sulfuric acid | Temperature of the solubility test | Melting point | Boiling point | Density |
| --- | --- | --- | --- | --- | --- | --- |
| O-chlorophenol | 1,95 cc. | 0,5 cc. | 20 | | at 1.2 mm.Hg 173–175 | 1,240 18/15 |
| p-nitrophenol | 1,3 gr. | 0,3 gr. | 21 | 112–113 | 279 | 1.479 20/ |
| o-isopropylphenol | 0,2 cc. | 0.05 cc. | 20 | 16 | 204 | 1.028 18/ |
| m-p isopropylphenol | 0,25 cc. | 0,10 cc. | 20 | | 217–225 | 0.983 30/ |
| o- sec. butylphenol | 0,20 cc. | 0,05 cc. | 22 | 14 | 78 | 0.981 20/ |
| o-ethylphenol | 1,0 cc. | 0,25 cc. | 25 | <−18 | at 2.5 mm.Hg 207.5 | 1.0374 12/ |

It has been found that these organic solvents for extraction, responding to the above indicated conditions, not only are stable with respect to the acidic solution, but they do not remain therein in any appreciable manner and, above all, are capable of extracting the lactam therefrom in a virtually quantitative amount.

On the other hand, they extract also small amounts of sulfuric acid but this, in practice, is no drawback, on account of the fact that very small fractions are in question, which can easily be removed by washing with water, said water, on the other hand, being not capable of removing in an appreciable manner these characteristic extraction solvents.

Obviously, the method according to the invention can be employed for the extraction of other lactams, preferably cycloaliphatic lactams, which are homologs of caprolactam and contained in acid solutions or reaction mixtures, irrespective of the origin of these mixtures, that is, of the method followed for obtaining such lactams.

According to a particular aspect of the invention, the unpredictability of the particularly advantageous behavior of the above defined extraction solvents, is due to the fact that they are not inactive with respect to the lactam acidic solution. It has been ascertained, in fact, that they interact with the salt (lactam sulfate) and solvate it but, this notwithstanding, they are not dissolved in any appreciable amount in the acid solution of the lactam concerned.

The possibility of carrying the invention into practice and the principal advantages which can be obtained thereby will become apparent from the scrutiny of a few possible embodiments thereof. In these examples the extraction of epsilon caprolactam as obtained in a sulfuric acid medium has been considered, but these conditions have, in any case, a nonlimiting nature with respect to the invention as such.

EXAMPLE 1

100 grams of an acidic solution of a lactam, coming from the Beckmann rearrangement of cyclohexanoneoxime in a sulfuric acid medium, and essentially comprising (in parts by weight) 45% of caprolactam, 53% of $H_2SO_4$ and 2% of by-products, have been diluted with 53 grams of water and extracted 5 times, in a 500-ml separatory funnel with 250 grs. of ortho-isopropylphenol as a total, by working at 25°C.

The exhausted acidic mass has been analysed. It contained traces, which could not be weighed, of ortho-isopropylphenol and only 0.15% of caprolactam.

The solution of caprolactam in ortho-isopropylphenol, in turn, has been analysed and it has been found that it contained also 20 grs. of sulfuric acid. Upon washing, as repeated for 3 times with a total amount of water of 150 mls, the sulfuric acid was totally absent from the phenol solution.

The thorough separation of the lactam from the acidic medium has thus been confirmed, in a virtually quantitative amount, without having provided for neutralizing the acid but, conversely, by maintaining it under such conditions as to be able completely to recover it.

The same procedure, as repeated with the use of meta- and para-cresol as the solvents, and their mixtures, has given as a result in the sulfuric refined product, 1.3% of cresols and 2.66% caprolactam, that is to say values which cannot be accepted in practice.

The lactam is subsequently separated from the extracting phenol solution. According to the suggestion of the prior art said extraction can be carried out by distillation.

EXAMPLE 2

With the same procedure as described in EXAMPLE 1, 100 grams of a corresponding lactam mass have been treated with a total of 250 grams of ortho-secondary butylphenol. Still using the same method, the phenol extract was treated with water until the sulfuric acid present therein disappeared, the quantitative separation of the lactam from the acidic medium being likewise obtained along with a corresponding quantitative recovery of the sulfuric acid.

EXAMPLE 3

An acidic lactam mass, coming from the nitrosation of hexahydrobenzoic acid with a sulfuric solution of $NOHSO_4$ has been separated from cyclohexane and used as a dissipating agent for the reaction heat. The mass comprises (in parts by weight) 18% hexahydrobenzoic acid, 15% caprolactam, 2% by-products, 60% $H_2SO_4$, and 5% $SO_3$.

To 500 grams of the mass there were added slowly and with stirring, with external cooling so as to prevent the temperature from exceeding 40°C, 115 grams of $H_2O$. By operating at a temperature of 20°C, the thus diluted mass was extracted 5 times with 150 mls at a time of cyclohexane, to remove the hexahydrobenzoic acid present quantitatively, which contained a negligible amount of by-products.

A second dilution was then carried out with 215 grams of $H_2O$ and, after this dilution, by operating at 30°C, there was carried out 5 times the extraction with 100 mls. each time of ortho-isopropyl phenol.

The exhausted acidic mass, when analysed, contained 0.5 grs caprolactam, 2.5 grams by-products and 0.1 grs. ortho-isopropylphenol.

The phenol extract, containing 74.5 grs. caprolactam, 7.5 grs. by-products and 32 grs. $H_2SO_4$ was washed 3 times with 100 mls water each time: through said operation all the sulfuric acid was removed along with 1.0 grs. of by-products, operating as in the preceding example, but taking up the caprolactam crystals by dissolving them in distilled water as they were precipitated, rather than carrying out their separation on a filter, and evaporating then the water, there were left 62.5 grs. of crystalline caprolactam, of a white colour and with a considerably high purity. The sulfuric refined product of extraction did not contain any appreciable quantity of the phenol as employed as the extraction medium.

What is claimed is:

1. A method for the extraction of caprolactam from reaction mixtures containing it, wherein the lactam is extracted with a liquid extraction medium, which is a phenol substituted by at least one alkyl substituent whose alkyl chain contains at least three carbon atoms, said substituent being capable of imparting lipophilic characteristics to the phenol and having a water solubility of less than 0.5 grams per 100 grams of water, and a solubility in sulfuric acid of less than 0.2 grams per 100 grams of 50% sulfuric acid.

2. A method as claimed in claim 1, wherein the phenol has a solubility in water of less than 0.3 grams per 100 grams of water and a solubility in sulfuric acid of less than 0.1 grams per 100 grams of 50% sulfuric acid.

3. A method according to claim 1, wherein a substituted phenol in which the nature, the amount and the position of the substituent groups are such as not completely to hinder the activity of the phenolic —OH group as detected by the fact that the absorption band, as exhibited at the infrared spectrophotometry at 2.5 microns, from very diluted solutions of phenols of any kind, is gradually shifted, for gradually more concentrated solutions of said substituted phenols, towards 3.0 – 3.2 microns.

4. A method according to claim 1, wherein monosubstituted and disubstituted phenols, including o-, m- and p-isopropylphenol, o-sec.butylphenol, o-tert.butylphenol, o-tert.amylphenol, o-sec.amylphenol, p-sec.amylphenol, di-sec-amylphenol, di-tert-amylphenol and admixtures thereof are used.

5. A method according to claim 1, wherein the solution containing the lactam is a solution in sulfuric acid.

6. A method according to claim 5, wherein the acidic solution containing the reaction mixture is a mixture resulting from nitrosation of a cycloaliphatic compound in the presence of sulfuric acid and/or oleum.

* * * * *